(12) United States Patent
Rancich et al.

(10) Patent No.: US 11,619,042 B2
(45) Date of Patent: Apr. 4, 2023

(54) WATERPROOF MEMBRANE WITH CROSS-LAMINATED FILM

(71) Applicants: Illinois Tool Works Inc., Glenview, IL (US); MGNT Products Group, LLC, Charlotte, NC (US)

(72) Inventors: Michael J. Rancich, Houston, TX (US); Peter Nielsen, Purcellville, VA (US); William M. DeJesus, Charlotte, NC (US)

(73) Assignees: Illinois Tool Works Inc., Glenview, IL (US); Schluter Systems L.P., Plattsburgh, NY (US)

(*) Notice: Subject to any disclaimer, the term of this patent is extended or adjusted under 35 U.S.C. 154(b) by 498 days.

(21) Appl. No.: 14/305,366

(22) Filed: Jun. 16, 2014

(65) Prior Publication Data

US 2014/0377519 A1 Dec. 25, 2014

Related U.S. Application Data

(60) Provisional application No. 61/836,750, filed on Jun. 19, 2013.

(51) Int. Cl.
*E04B 1/66* (2006.01)
*B32B 7/12* (2006.01)
(Continued)

(52) U.S. Cl.
CPC .............. *E04B 1/665* (2013.01); *B32B 5/022* (2013.01); *B32B 5/22* (2013.01); *B32B 5/24* (2013.01); *B32B 5/26* (2013.01); *B32B 7/12* (2013.01); *B32B 27/08* (2013.01); *B32B 27/12* (2013.01); *B32B 27/32* (2013.01); *B32B 37/12* (2013.01); *B32B 37/206* (2013.01);
(Continued)

(58) Field of Classification Search
CPC combination set(s) only.
See application file for complete search history.

(56) References Cited

U.S. PATENT DOCUMENTS 4,469,741 A 9/1984 Akao
4,606,970 A 8/1986 Sharps, Jr.
(Continued)

FOREIGN PATENT DOCUMENTS

CN 2815683 Y 9/2006
CN 201730117 U 2/2011
(Continued)

OTHER PUBLICATIONS

International Preliminary Report on Patentability (CH. 1 of PCT) and Written Opinion dated Dec. 22, 2015, in PCT/US2014/042511.
(Continued)

*Primary Examiner* — Lynda Salvatore
(74) *Attorney, Agent, or Firm* — Levenfeld Pearlstein, LLC

(57) ABSTRACT

A waterproof membrane includes first and second nonwoven layers each having first and second surfaces. A cross laminated film layer is disposed between the first and second non-woven layers. Tie layers are applied between the non-woven layers and the cross laminated film layer. A method of making a waterproof membrane, a method of establishing a waterproof barrier between a substrate and a tile, and a flexible membrane for use in a curvilinear surface are also disclosed.

17 Claims, 1 Drawing Sheet

(51) Int. Cl.
    *B32B 27/12*     (2006.01)
    *B32B 5/22*     (2006.01)
    *B32B 5/24*     (2006.01)
    *B32B 5/26*     (2006.01)
    *B32B 27/32*     (2006.01)
    *B32B 5/02*     (2006.01)
    *B32B 27/08*     (2006.01)
    *B32B 37/12*     (2006.01)
    *B32B 37/20*     (2006.01)

(52) U.S. Cl.
    CPC ....... *B32B 2250/05* (2013.01); *B32B 2250/24* (2013.01); *B32B 2250/242* (2013.01); *B32B 2250/40* (2013.01); *B32B 2255/10* (2013.01); *B32B 2262/0253* (2013.01); *B32B 2270/00* (2013.01); *B32B 2274/00* (2013.01); *B32B 2307/7265* (2013.01); *Y10T 428/24942* (2015.01); *Y10T 442/678* (2015.04)

(56) References Cited

U.S. PATENT DOCUMENTS

| | | |
|---|---|---|
| 6,075,179 A | 6/2000 | McCormack et al. |
| 6,284,344 B1 | 9/2001 | Barnes et al. |
| 2002/0106959 A1* | 8/2002 | Huffines ............ A61F 13/51458 |
| | | 442/394 |
| 2006/0194004 A1* | 8/2006 | Niemoller ................ B32B 7/12 |
| | | 428/32.11 |

FOREIGN PATENT DOCUMENTS

| | | | |
|---|---|---|---|
| EP | 0541311 A1 | 5/1993 | |
| WO | 2005065941 A1 | 7/2005 | |
| WO | WO 2007115816 | * 10/2007 | ............... C08L 23/14 |

OTHER PUBLICATIONS

International Search Report for PCT/US2014/042511, dated Oct. 1, 2014.

* cited by examiner

WATERPROOF MEMBRANE WITH CROSS-LAMINATED FILM

CROSS-REFERENCE TO RELATED APPLICATION DATA

The present application claims the benefit of and priority to Provisional U.S. patent application Ser. No. 61/836,750, filed Jun. 19, 2013, the disclosure of which is incorporated herein by reference in its entirety.

BACKGROUND

The ability to effectively waterproof a building structure such as a wall or floor is extremely important. Waterproofing is important to prevent moisture incursion into, and degradation of, the underlying substrate and structure.

In one example, a waterproof surface is required between tile and an underlying substrate (e.g., walls or floor) and the supporting structure, (e.g., studs), in bathrooms, showers and the like where wet environments and moisture and/or water incursion may occur. Water will often seep behind tile walls or underneath floors, through grout, and into the wall or floor substrate. If the underlying substrate is formed from a water resistant or perhaps even a waterproof material, potential damage to the substrate and the underlying structure is minimized. For example, cement board or water resistant gypsum wall board are often used as a substrate in showers and the like.

However, such materials are not inherently waterproof and may be subject to degradation over time. Moreover, in use, board-formed materials may be cut and seams used where boards are placed together, such as along extended surfaces, at corners, around openings and the like, which exacerbates the potential for water incursion and degradation. As such, water and/or moisture incursion into the substrate, or though the substrate and into the underlying structure may occur unless these substrates are protected across their entire surfaces with a waterproof element.

Other materials are also known. For example, KERDI-BOARD, commercially available from Schluter is multi-component, waterproof board for use in areas that may be subjected to high moisture. However, because they are rigid members that may require seams and cuts to accommodate long stretches of surface, corners and the like, the seams and penetrations must be treated with a waterproof element.

Accordingly, there is a need for a waterproof element for use in high moisture environments in new construction, remodeling and retrofits. Desirably, such an element is flexible and in sheet or roll form. More desirably still, such an element is formed as a membrane, is sufficiently flexible to permit use in corners, curved areas and the like, without seams and joints. Still more desirably, such a material is sufficiently strong, e.g., high strength, to prevent tears and punctures when used at, for example, construction sites.

SUMMARY

A membrane includes a first non-woven layer having first and second surfaces, a cross laminated film layer, a second non-woven layer having first and second surfaces and a tie layer between the first non-woven first surface and the cross laminated film and the second non-woven first surface and the cross laminated film.

The cross laminated film can be an oriented cross laminated film. In an embodiment the oriented cross laminated film is a high density polyethylene (HDPE) oriented cross laminated film. In an embodiment, the HDPE oriented cross laminated film has a thickness of about 3.0 thousandths of an inch (mils).

The tie layer can be a polyolefin or polyolefin copolymer or blend thereof. In an embodiment, the tie layer is a propylene based elastomer blend. One blend is a blend with low density polyethylene (LDPE). In such a blend, the propylene based elastomer can be present at about 10 percent to about 60 percent by weight of the tie layer blend, and can be about 25 percent by weight of the blend, and LDPE can be present at about 40 percent to about 90 percent by weight of the tie layer blend, and can be about 75 percent by weight of the blend. The tie layer can be present or applied at about 5 lbs per ream to about 20 lbs per ream of membrane and can be at about 7 lbs per ream to about 10 lbs per ream.

The non-woven layer can be a polypropylene non-woven fabric. The fabric can have a basis weight of about 0.5 ounces per square yard (osy) to about 4.0 osy, and can be about 0.9 osy.

A waterproof membrane can be formed having first and second polypropylene non-woven layers having first and second surfaces, a HDPE oriented cross laminated film layer, and a tie layer between the first non-woven first surface and the oriented cross laminated film layer and between the second non-woven first surface and the oriented cross laminated film layer. The tie layer can be a propylene based elastomer or propylene based elastomer blend.

The first and second polypropylene non-woven layers can each have a basis weight about 0.9 osy, the HDPE oriented cross laminated film layer can have a thickness of about 3.0 mils, and each tie layer can present at about 7 to about 10 lbs per ream of membrane. In such a membrane, the tie layers are a propylene based elastomer blend with LDPE with the propylene based elastomer present at about 25 percent by weight of the blend and LDPE present at about 75 percent by weight of the blend.

A method of making a waterproof membrane includes adhering a cross laminated film layer between first and second polypropylene non-woven layers having first and second surfaces. In such a method, the cross laminated film layer can be an oriented cross laminated film layer, such as a HDPE oriented cross laminated film layer. In such a method the adhering step can be carried out by applying a tie layer between the first non-woven layer and the oriented cross laminated film and applying a tie layer between the second non-woven layer and the oriented cross laminated film.

The adhering step can include laminating the first non-woven layer to the oriented cross laminated film layer at a side of the oriented cross laminated film layer and laminating the second non-woven layer to the oriented cross laminated film layer at an opposite side of the oriented cross laminated film layer. The laminating steps can be performed using extrusion lamination.

In an embodiment, a method of establishing a waterproof barrier between a substrate and a tiled wall includes applying on the substrate a waterproof membrane having a first non-woven layer with first and second surfaces, a cross laminated film layer, a second non-woven layer with first and second surfaces and a tie layer between the first non-woven first surface and the cross laminated film and the second non-woven first surface and the cross laminated film. Tile is then applied over the waterproof membrane. The method can include the steps of applying a coat of thinset adhesive on the substrate; applying the waterproof membrane to the thinset adhesive, applying a second coat of thinset on the membrane, and applying the tile to the coat of thinset adhesive.

These and other features and advantages of the present invention will be readily apparent from the following detailed description, in conjunction with the claims.

DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION

Figure 1:
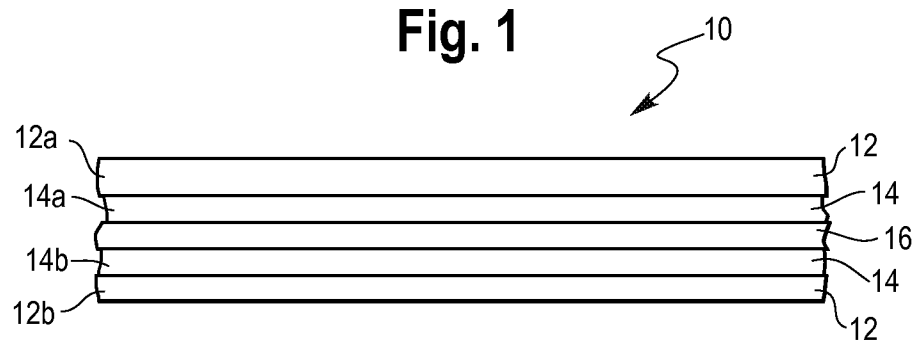
FIG. 1 is a cross-sectional view of a waterproof membrane with cross laminated film.

While the present disclosure is susceptible of embodiment in various forms, there is shown in the drawings and will hereinafter be described one or more embodiments with the understanding that the present disclosure is to be considered an exemplification thereof and is not intended to be limited to the specific embodiment or embodiments illustrated.

FIG. 1 illustrates a waterproof membrane 10 with cross laminated film. An embodiment of the membrane 10 is formed as a laminate having a structure of ABCBA in which A is a non-woven sheet 12, B is a polymeric tie resin layer 14 and C is an oriented cross laminated film 16.

One non-woven sheet 12 is a polypropylene (PP) non-woven fabric having a basis weight of about 0.5 osy to about 4.0 osy, and can be about 0.9 osy. A suitable material is Elite 100 Lt. Grey #49623 commercially available from Hanes Companies, Inc. Such a material has a basis weight of about 0.9 ounces per yard (osy) per ASTM D 3776M-09A, an elongation of about 75 percent in the machine direction and 85 percent in the cross direction per ASTM D 5034-09, a grab tensile strength of about 86 Newtons/2.54 centimeters (N/2.54 cm) in the machine direction and 70 N/2.54 cm in the cross direction per ASTM D 5034-09 and a trap tear strength of about 7 pounds (lbs) in the machine direction and 9.7 lbs in the cross direction per ASTM D 5733-09.

Other suitable materials for the non-woven sheet 12 include polyethylene terephthalate (PET), for example, a PET pointbond non-woven material. Other suitable materials will be recognized by those skilled in the art.

The polymeric tie layer 14 provides adhesion between the non-woven sheet 12 and the oriented cross laminated film 16 (discussed below). The tie layer can be a polyolefin or polyolefin copolymer or blend thereof. In an embodiment, the tie layer is a propylene based elastomer blend. One blend is a blend with low density polyethylene (LDPE). In such a blend, the propylene based elastomer can be present at about 10 percent to about 60 percent by weight of the tie layer blend, and can be about 25 percent by weight of the blend, and LDPE can be present at about 40 percent to about 90 percent by weight of the tie layer blend, and can be about 75 percent by weight of the blend. The tie layer can be present or applied at about 5 lbs per ream to about 20 lbs per ream of membrane and can be at about 7 lbs per ream to about 10 lbs per ream. One suitable LDPE is commercially available from Westlake Chemical Corporation under the designation EC808. Other suitable materials include LyondellBasell NA214.

One suitable propylene based elastomer is commercially available from Exxon-Mobil Chemical as Vistamaxx™ 6202. Other suitable materials include thermoplastic polyolefins, such as Adflex Z 108, commercially available from LyondellBasell Industries. In an embodiment, the tie layer 14 is formulated from a blend of about 75 percent (by weight) LDPE and 25 percent (by weight) propylene based elastomer. The specific formulation can vary as will be recognized by those skilled in the art.

One suitable cross laminated film 16 is an oriented cross laminated polyolefin, such as a high density polyethylene (HDPE) film commercially available from VALERON® Strength Films of Houston, Tex. The oriented cross laminated HDPE film 16 has a thickness of about 3.0 mils. The VALERON® Strength Films brand film is an HDPE material that is formed from a cross laminate of two film layers or plies that are each extruded and bias cut in a continuous spiral to obtain molecular orientation at an angle between 1 degree and 89 degrees with the machine direction. The bias cut film plies are then cross-laminated, and can be, although not necessarily, cross-laminated with an adhesive or polymer between the film layers to form a web. Such a film is disclosed and described in Barnes, U.S. Pat. No. 6,284,344, which is commonly assigned with the present application and is incorporated herein by reference. Other materials, such as polyethylene terephthalate (PET), polyolefins, including polypropylene (PP), polyamides and coextruded polymeric materials are contemplated for use as the oriented cross laminated film 16. Such films, for example, the VALERON® Strength Films brand film, may be provided as a material that includes more than two plies; such films are within the scope and spirit of the present disclosure.

In a present membrane 10, the non-woven layer 12 is a polypropylene non-woven material in a basis weight of about 0.9 osy, the tie layer is, as noted above, a blend of 75 percent by weight LDPE and 25 percent by weight propylene elastomer. Each tie layer 14 is present at about 7-10 lbs per ream, and in an embodiment, about 8 lbs per ream of membrane 10, and the oriented cross laminated film 16 is a 3.0 mil VALERON® Strength Films brand film.

It is contemplated that the membrane 10 will be made in a lamination process. For example, in one extrusion lamination process, in a first-pass lamination, the non-woven material 12a is laminated to the oriented cross laminated film 16 using about 7 to 10 lbs per ream of the tie layer 14a blend forming a partially formed membrane. In a second-pass lamination, the non-woven material 12b is laminated to the opposing side of the oriented cross laminated film 16, again using about 7 to 10 lbs per ream of the tie layer 14b blend to form the ABCBA structure described above. Other processes and other lamination processes are also contemplated, including adhesives, solvent-less bonding and the like.

It has also been found that the tie layers 14 can be formulated from essentially 100 percent propylene elastomer (e.g., 100 percent Vistamaxx™ 6202) and that a membrane 10 formed as such functions well.

Figure 2:
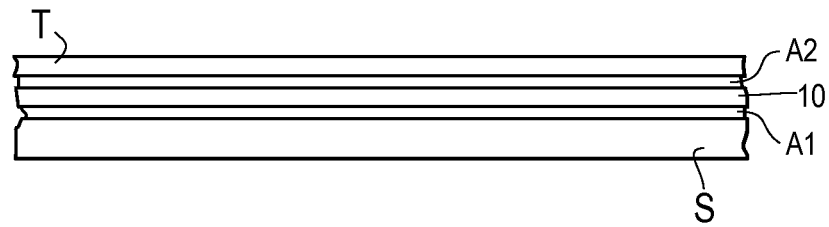
FIG. 2 is a cross-sectional view of an exemplary use of the membrane in application of tile to a wall or floor.

In one contemplated use, as illustrated in FIG. 2, the membrane 10 is used as a waterproofing membrane behind wall or floor tile T in a shower or under a floor for waterproofing or to prevent reflection cracking. The membrane 10 is applied to the substrate S (e.g., gypsum board, cement board or the like) in the tile area with a thinset adhesive A1 (such adhesives will be recognized by those skilled in the art). After a sufficient drying/curing time (about 24 hours), the tile T is adhered to the other side of the membrane 10 using thinset adhesive A2. It will be appreciated that the membrane 10 can be applied through corners, over surface irregularities, and in non-linear locations (e.g., curved or curvilinear surfaces) without the need for seams and the like.

In an embodiment, a method of establishing a waterproof barrier between a substrate and a tiled wall includes applying on the substrate a waterproof membrane having a first non-woven layer with first and second surfaces, a cross laminated film layer, a second non-woven layer with first and second surfaces and a tie layer between the first non-woven first surface and the cross laminated film and the second non-woven first surface and the cross laminated film. Tile is then applied over the waterproof membrane. The method can include the steps of applying a coat of thinset adhesive on the substrate, applying the waterproof membrane to the thinset adhesive, applying a second coat of thinset on the membrane, and applying the tile to the coat of thinset adhesive. The cross laminated film can be an oriented cross laminated film.

It has been found that the present membrane provides surprising flexibility and light weight in a high strength structure. The strength and physical properties provided by a flexible film, such as the VALERON® brand film, allows for significantly less polymer to be used between the non-woven surface layers. This permits a thinner structure which is more flexible than known products. In addition, this provides a membrane that is easier to handle and to apply to a work area. In that the film layer can be a relatively thin element (about 3.0 mils), there is reduced stiffness which makes it easier to embed the product in thinset adhesive applied to the wall structure and also allows the film to conform to corners, curvilinear surfaces, such as arches and the like, and surface irregularities. The light weight of the membrane 10 helps to prevent it from sliding down the wall during application due to its own weight.

In addition, the membrane provides an excellent barrier to water vapor. The oriented films, such as the HDPE based VALERON® brand film, provides an excellent barrier to water vapor which permits use in regular and steam showers. Known lower barrier elements require thicker polymer layers to meet the requirements for steam showers. This results in a thicker, less flexible and heavier membrane.

A sample of a membrane according to the present disclosure was compared to a sample of a commercially available waterproof membrane for use in areas that may be subjected to high moisture. The samples were tested for tensile break in the machine and transverse directions measured in pounds per inch (lbs/in) in accordance with standard ASTM D 882, tear propagation resistance (trouser tear) in the machine and transverse directions measured in pounds per inch (lbs/in) in accordance with standard ASTM D 1938, Toyo impact measured in kilogram centimeters (kg*cm) in accordance with a modified standard ASTM D 781 (mod) and water vapor transmission rate (WVTR) measured in US Perms (1 grain of water vapor per hour, per square foot, per inch of mercury) at 37.8 C at 90% relative humidity, in accordance with standard ASTM E96—procedure E. The basis weight of each sample was also measured. The results are shown below in Table 1.

TABLE 1

COMPARISON OF VARIOUS PHYSICAL PROPERTIES FOR A PRESENT MEMBRANE AND A COMMERCIALLY AVAILABLE WATERPROOF MEMBRANE

| Physical Property | Method | Units | | Present membrane | Commercially available waterproof membrane |
|---|---|---|---|---|---|
| Basis wt. | | Lbs/ream | | 101 | 163 |
| Tensile break | ASTM D 882 | Lbs/in | MD | 32 | 31 |
| | | | TD | 29 | 24 |
| Tear propagation | ASTM D 1938 | lbs | MD | 7.2 | 5.9 |
| | | | TD | 6.6 | 6.4 |
| Toyo impact | ASTM D 781 (mod) | Kg*cm | | 145 | 100 |
| WVTR | ASTM E96-Proc. E | US Perms | 37.8 C., 90% RH | <0.075 | 0.90 |

As can be seen from the data of Table 1, above, a membrane in accordance with the present disclosure has a number of advantages over the commercially available waterproof membrane. The present membrane is lighter in weight and stronger in each category tested. In addition, it exhibits a lower water vapor transmission rate when tested at 37.8 C and at a relative humidity of 90%.

The tie layer or resin, e.g., the elastomer used to laminate the non-woven and oriented cross laminated film layers, provides excellent adhesion to both the HDPE based films the PP or other-based non-woven material. Again, the specific formulation of the tie layer can be varied to meet the requirements and suitability of the adhesion needs between the oriented cross laminated film and the non-woven material. The elastomer tie layer reduces the stiffness of the laminating layers further enhancing the flexibility of the membrane.

In the present disclosure, the words "a" or "an" are to be taken to include both the singular and the plural. Conversely, any reference to plural items shall, where appropriate, include the singular.

From the foregoing it will be observed that numerous modification and variations can be effectuated without departing from the true spirit and scope of the novel concepts of the present membrane. It is to be understood that no limitation with respect to the specific embodiments illustrated is intended or should be inferred. The disclosure is intended to cover by the appended claims all such modifications as fall within the scope of the claims.

What is claimed is:

1. A waterproof extrusion laminated membrane, comprising:
   a first non-woven layer having first and second surfaces;
   a water impermeable cross laminated film layer formed from two plies of high density polyethylene, the two plies being mechanically oriented forming an oriented cross laminated film, the cross laminated film layer having a thickness of about 3.0 mils;
   a second non-woven layer having first and second surfaces; and
   a tie layer between the first non-woven first surface and the oriented cross-laminated film and the second non-woven first surface and the oriented cross-laminated film,
   wherein the membrane is flexible and exhibits a tensile break in a machine direction and a transverse direction measured in accordance with standard ASTM D 882 of about 32 lbs/in and 29 lbs/in, respectively, a tear propagation resistance in the machine direction and the transverse direction measured in accordance with standard ASTM D 1938 of about 7.2 lbs/in and 6.6 lbs/in, respectively, a Toyo impact measured in accordance with a modified standard ASTM D 781 of about 145 kilogram centimeters, and a water vapor transmission rate measured in accordance with standard ASTM E96—procedure E of less than about 0.075 US Perms measured at about 37.8 C at about 90% relative humidity, wherein the tie layer is a polyolefin or polyolefin copolymer or a blend thereof.

2. A waterproof extrusion laminated membrane, comprising:
   a first non-woven layer having first and second surfaces;
   a water impermeable cross laminated film layer formed from two plies of high density polyethylene, the two plies being mechanically oriented forming an oriented cross laminated film, the cross laminated film layer having a thickness of about 3.0 mils;
   a second non-woven layer having first and second surfaces; and
   a tie layer between the first non-woven first surface and the oriented cross-laminated film and the second non-woven first surface and the oriented cross-laminated film,
   wherein the membrane is flexible and exhibits a tensile break in a machine direction and a transverse direction measured in accordance with standard ASTM D 882 of about 32 lbs/in and 29 lbs/in, respectively, a tear propagation resistance in the machine direction and the transverse direction measured in accordance with standard ASTM D 1938 of about 7.2 lbs/in and 6.6 lbs/in, respectively, a Toyo impact measured in accordance with a modified standard ASTM D 781 of about 145 kilogram centimeters, and a water vapor transmission rate measured in accordance with standard ASTM E96—procedure E of less than about 0.075 US Perms measured at about 37.8 C at about 90% relative humidity,
   wherein the tie layer is a propylene based elastomer blend.

3. The membrane of claim 2 wherein the propylene based elastomer blend includes low density polyethylene (LDPE).

4. The membrane of claim 3 wherein the propylene based elastomer is present at about 10 percent to about 60 percent by weight of the blend and wherein the LDPE is present at about 40 percent to about 90 percent by weight of the blend.

5. The membrane of claim 3 wherein the propylene based elastomer is present at about 25 percent by weight of the blend and wherein the LDPE is present at about 75 percent by weight of the blend.

6. A waterproof extrusion laminated membrane, comprising:
   a first non-woven layer having first and second surfaces;
   a water impermeable cross laminated film layer formed from two plies of high density polyethylene, the two plies being mechanically oriented forming an oriented cross laminated film, the cross laminated film layer having a thickness of about 3.0 mils;
   a second non-woven layer having first and second surfaces; and
   a tie layer between the first non-woven first surface and the oriented cross-laminated film and the second non-woven first surface and the oriented cross-laminated film,
   wherein the membrane is flexible and exhibits a tensile break in a machine direction and a transverse direction measured in accordance with standard ASTM D 882 of about 32 lbs/in and 29 lbs/in, respectively, a tear propagation resistance in the machine direction and the transverse direction measured in accordance with standard ASTM D 1938 of about 7.2 lbs/in and 6.6 lbs/in, respectively, a Toyo impact measured in accordance with a modified standard ASTM D 781 of about 145 kilogram centimeters, and a water vapor transmission rate measured in accordance with standard ASTM E96—procedure E of less than about 0.075 US Perms measured at about 37.8 C at about 90% relative humidity,
   wherein the tie layer is present at about 5 to about 20 lbs per ream of membrane.

7. The membrane of claim 6 wherein the tie layer is present at about 7 to about 10 lbs per ream of membrane.

8. The membrane of claim 1 wherein the non-woven layer is a polypropylene non-woven fabric.

9. The membrane of claim 1 wherein the polypropylene non-woven fabric has a basis weight of about 0.5 osy to about 4.0 osy.

10. The membrane of claim 9 wherein the polypropylene non-woven fabric has a basis weight of about 0.9 osy.

11. The membrane of claim 1 wherein the HDPE oriented cross laminated film has a thickness of about 3.0 mils.

12. An extrusion laminated waterproof membrane, comprising:
    first and second polypropylene non-woven layers having first and second surfaces;
    a water impermeable HDPE oriented cross laminated film layer, the oriented cross laminated film layer having a thickness of about 3.0 mils; and
    a tie layer between the first non-woven first surface and the oriented cross laminated film layer and the second non-woven first surface and the oriented cross laminated film layer, the tie layer being a propylene based elastomer or propylene based elastomer blend,
    wherein the first and second polypropylene non-woven layers each have a basis weight of about 0.9 osy, the HDPE oriented cross laminated film layer has a thickness of about 3.0 mils, and each tie layer is present at about 7 to about 10 lbs per ream of membrane,
    wherein the tie layer is a propylene based elastomer blend with LDPE and wherein the propylene based elastomer is present at about 25 percent by weight of the blend and wherein the LDPE is present at about 75 percent by weight of the blend, and
    wherein the membrane is flexible.

13. A waterproof extrusion laminated flexible membrane for waterproofing a curvilinear finished surface, comprising:
    first and second polypropylene non-woven layers having first and second surfaces;
    a water impermeable HDPE oriented cross laminated film layer, the cross laminated film layer having a thickness of about 3.0 mils; and
    a tie layer between the first non-woven first surface and the cross laminated film layer and the second non-woven first surface and the cross laminated film layer, the tie layer being a propylene based elastomer or propylene based elastomer blend,
    wherein the flexible membrane may be seamlessly applied to a substrate on a curvilinear surface for waterproofing,
    wherein the first and second polypropylene non-woven layers each have a basis weight of about 0.9 osy, the oriented cross laminated film layer has a thickness of about 3.0 mils, and each tie layer is present at about 7 to about 10 lbs per ream of membrane, and wherein the tie layer is a propylene based elastomer blend with LDPE and wherein the propylene based elastomer is present at about 25 percent by weight of the blend and wherein the LDPE is present at about 75 percent by weight of the blend.

14. The membrane of claim 2 wherein the non-woven layer is a polypropylene non-woven fabric.

15. The membrane of claim 2 wherein the polypropylene non-woven fabric has a basis weight of about 0.5 osy to about 4.0 osy.

16. The membrane of claim 15 wherein the polypropylene non-woven fabric has a basis weight of about 0.9 osy.

17. The membrane of claim 2 wherein the HDPE oriented cross laminated film has a thickness of about 3.0 mils.

* * * * *